United States Patent
Soukup et al.

(10) Patent No.: US 10,805,693 B2
(45) Date of Patent: Oct. 13, 2020

(54) DEVICE AND METHOD FOR GPU-BASED WATERMARKING

(71) Applicant: Irdeto B.V., Hoofddorp (NL)

(72) Inventors: Martin Soukup, Ottawa (CA); Daniel Murdock, Ontario (CA)

(73) Assignee: IRDETO B.V., Hoofddorp (NL)

( * ) Notice: Subject to any disclaimer, the term of this patent is extended or adjusted under 35 U.S.C. 154(b) by 0 days.

(21) Appl. No.: 16/129,486

(22) Filed: Sep. 12, 2018

(65) Prior Publication Data

US 2019/0141414 A1 May 9, 2019

Related U.S. Application Data

(60) Provisional application No. 62/557,187, filed on Sep. 12, 2017.

(51) Int. Cl.
*H04N 7/167* (2011.01)
*H04N 21/8358* (2011.01)
(Continued)

(52) U.S. Cl.
CPC .......... *H04N 21/8358* (2013.01); *G06F 8/60* (2013.01); *G06F 21/14* (2013.01); *G06F 21/16* (2013.01); *G06T 1/0021* (2013.01); *G06T 15/005* (2013.01); *H04L 63/101* (2013.01); *H04N 21/2393* (2013.01); *H04N 21/2585* (2013.01); *H04N 21/25833* (2013.01); *H04N 21/25841* (2013.01); *H04N 21/25891* (2013.01); *G06F 2221/0737* (2013.01);
(Continued)

(58) Field of Classification Search
CPC .......... H04N 21/8358; H04N 21/2393; H04N 21/25833; H04N 21/25841; H04N 21/2585; H04N 21/258591
USPC .......................................................... 725/31
See application file for complete search history.

(56) References Cited

U.S. PATENT DOCUMENTS

| | | | |
|---|---|---|---|
| 6,889,325 B1 * | 5/2005 | Sipman | G06Q 20/04 380/268 |
| 2002/0072982 A1 * | 6/2002 | Barton | G06Q 30/02 705/14.1 |

(Continued)

OTHER PUBLICATIONS

International Search Report and Written Opinion received for International Application No. PCT/IB2018/001151 dated Jan. 31, 2019, 13 pages.

(Continued)

*Primary Examiner* — Michael B. Pierorazio
(74) *Attorney, Agent, or Firm* — Rimon PC; Marc Kaufman

(57) ABSTRACT

A method and system for watermarking content utilizing a user device GPU. Embodiments include receiving on a processing server a request from a video server for a video to be played on the user's device. The processing server may extract a set of identifying information, such as user information, from the request for the video. The processing server may further prepare shader software code which is to be executed on a GPU present on the user's device. The code preparation may include creating a watermarking procedure to be executed during playback on the user device. The processing server may further transmit the shader software code to the streaming video server to be transmitted to the user device for execution during video playback.

26 Claims, 5 Drawing Sheets

(51) Int. Cl.
*G06F 21/16* (2013.01)
*G06T 1/00* (2006.01)
*G06F 8/60* (2018.01)
*G06F 21/14* (2013.01)
*G06T 15/00* (2011.01)
*H04L 29/06* (2006.01)
*H04N 21/239* (2011.01)
*H04N 21/258* (2011.01)

(52) U.S. Cl.
CPC ............... *G06F 2221/2103* (2013.01); *G06F 2221/2141* (2013.01); *H04L 2209/16* (2013.01)

(56) References Cited

U.S. PATENT DOCUMENTS

| | | | |
|---|---|---|---|
| 2005/0028195 A1* | 2/2005 | Feinleib | H04N 7/163 725/32 |
| 2005/0192863 A1* | 9/2005 | Mohan | G06Q 30/0277 705/14.19 |
| 2006/0224452 A1* | 10/2006 | Ng | G06Q 30/02 705/14.14 |
| 2006/0256133 A1* | 11/2006 | Rosenberg | G06F 3/013 345/619 |
| 2007/0124756 A1* | 5/2007 | Covell | G06F 16/683 725/18 |
| 2007/0179850 A1* | 8/2007 | Ganjon | G06Q 30/00 705/14.27 |
| 2009/0313670 A1* | 12/2009 | Takao | H04N 5/44591 725/110 |
| 2010/0114713 A1* | 5/2010 | Anderson | G06Q 20/10 705/14.69 |
| 2011/0273455 A1* | 11/2011 | Powar | G10H 1/368 345/473 |
| 2012/0295560 A1* | 11/2012 | Mufti | H04N 21/4394 455/95 |
| 2012/0297400 A1* | 11/2012 | Hill | G06F 16/748 719/318 |
| 2012/0316969 A1* | 12/2012 | Metcalf, III | G06Q 30/0269 705/14.66 |
| 2013/0029762 A1* | 1/2013 | Klappert | G06Q 30/02 463/31 |
| 2013/0031579 A1* | 1/2013 | Klappert | H04N 21/454 725/32 |
| 2013/0042262 A1* | 2/2013 | Riethmueller | G06F 16/74 725/14 |
| 2013/0044051 A1* | 2/2013 | Jeong | H04N 21/485 345/156 |
| 2013/0067512 A1* | 3/2013 | Dion | G06Q 30/02 725/34 |
| 2013/0073366 A1* | 3/2013 | Heath | G06Q 30/0261 705/14.25 |
| 2013/0073377 A1* | 3/2013 | Heath | G06Q 30/02 705/14.39 |
| 2013/0080242 A1* | 3/2013 | Alhadeff | G06Q 30/0239 705/14.39 |
| 2013/0080262 A1* | 3/2013 | Scott | G06Q 10/109 705/14.68 |
| 2013/0085828 A1* | 4/2013 | Schuster | G06Q 30/0207 705/14.25 |
| 2013/0111519 A1* | 5/2013 | Rice | G06Q 30/02 725/34 |
| 2013/0124073 A1* | 5/2013 | Ren | G08G 1/00 701/118 |
| 2013/0297737 A1* | 11/2013 | Wajs | G06F 21/10 709/217 |
| 2015/0227922 A1* | 8/2015 | Filler | G06F 3/04842 705/41 |

OTHER PUBLICATIONS

Brunton et al., "Real-Time Video Watermarking on Programmable Graphics Hardware", Electrical and Computer Engineering, 2005. Canadian Conference on Saskatoon, May 1-4, 2005, pp. 1312-1315.

Emanuele N De L F et al., "Sensor Watermark: a scheme of software watermark using code obfuscation and tamperproofing for WSN", International Wireless Communications and Mobile Computing Conference, IEEE, Aug. 24, 2015, pp. 916-922.

Huang et al., "A Control Flow Obfuscation Method to Discourage Malicious Tampering of Software Codes", ASIACC 06, ACM, Mar. 21, 2006, p. 362.

* cited by examiner

DEVICE AND METHOD FOR GPU-BASED WATERMARKING

RELATED APPLICATION DATA

The present application claims priority to U.S. provisional patent application No. 62/557,187 filed on Sep. 12, 2017, the entire content of which is incorporated herein by reference.

TECHNICAL FIELD

The present disclosure generally relates to watermarking, and in particular, to watermarking video streams.

BACKGROUND

Video streaming services, such as "Over-the-top" (OTT) video streaming services are ubiquitous in today's society with video being consumed at an enormous rate. Video on demand services such as Amazon™ Video and Netflix™ account for a large amount of overall network internet traffic during peak use hours. As a result, content piracy is becoming a large issue. It is known to use various digital watermarking schemes to identify pirated video sources. "Digital watermarking" refers to modifications of digital content that can be detected and used to track the origin or distribution channel of the content. Various digital watermarking algorithms are well known, such as those described in *A Survey of Digital Watermarking Techniques and it Applications*, Lalit Kumar and Vishal Shrivastava, International Journal of Computer Science Trends and Technology (IJCST)—Volume 2 Issue 3, May-June 2014. OTT video is now being watched using video players on cellphones, laptops, tablet devices and televisions through so many outlets that known watermarking techniques may not always be robust and secure. There is a need, therefore, for greater watermarking capabilities on video streaming devices to account for all of the variety of direct means through which users are watching protected content.

One form of digital watermarking is client-based watermarking, i.e. systems in which the content is modified by a client device, such as the rendering device. Client based watermarking is often difficult to integrate, must be integrated into many environments to meet most deployments, and rarely may be changed easily once deployed because the distributor often does not have access to the client devices. Another form of digital watermarking is server-based watermarking. Server based watermarking may be more easily changed, but often requires integration into complex content delivery pipelines, introduces delays in live broadcasts, and may have storage bandwidth and cost impacts on delivery. There is a need therefore for a more robust and flexible solution for digital watermarking and delivery of content.

SUMMARY

A brief summary of various embodiments is presented below. Some simplifications and omissions may be made in the following summary, which is intended to highlight and introduce some aspects of the invention. Detailed descriptions of embodiments adequate to allow those of ordinary skill in the art to make and use the inventive concepts will follow in later sections.

Various embodiments described herein relate to a method for digital watermarking and detecting digital watermarks utilizing the user device graphics processing unit (GPU). Embodiments include receiving on a processing server a request from a video server for a video to be played on the user device. The processing server may extract a set of identifying information, such as user information, from the request for the video. The processing server may further prepare shader software code which is to be executed on a GPU present on the user device. The code preparation may include creating a watermarking procedure to be executed during playback on the user device. The processing server may further transmit the shader software code to the streaming video server to be transmitted to the user device for execution during video playback.

Various embodiments described herein relate to a method and device performed by a detection server. The method may include processing, by the detection server, a video or image. The detection server may further identify a digital watermark embedded in the video, where the watermark was created during execution of a watermarking procedure on a user device. In some embodiments, the watermark procedure may have been created using the user's information and prepared by a processing server as part of a shader software code executed on the GPU of the user device. In some embodiments, the detection server may transmit to the processing server an indication to blacklist the user device.

Various embodiments described herein relate to a device including a network interface, a processor configured to execute computer readable instructions included on a non-transitory memory, and a non-transitory memory including computer readable instructions. When executed by the processor, the computer readable instructions may cause the device to receive a request from a streaming video server for a video to be played on a user device. The processing server may extract a set of identifying information, such as user information, from the request for the video and prepare shader software code to be executed on a GPU on the user device. The preparing may include creating, using the identifying information, a watermarking procedure to be executed during playback on the user device to thereby embed a watermark in the video. The processing server may transmit the shader software code to the streaming video server to be transmitted to the user device for execution by the user device during video playback.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
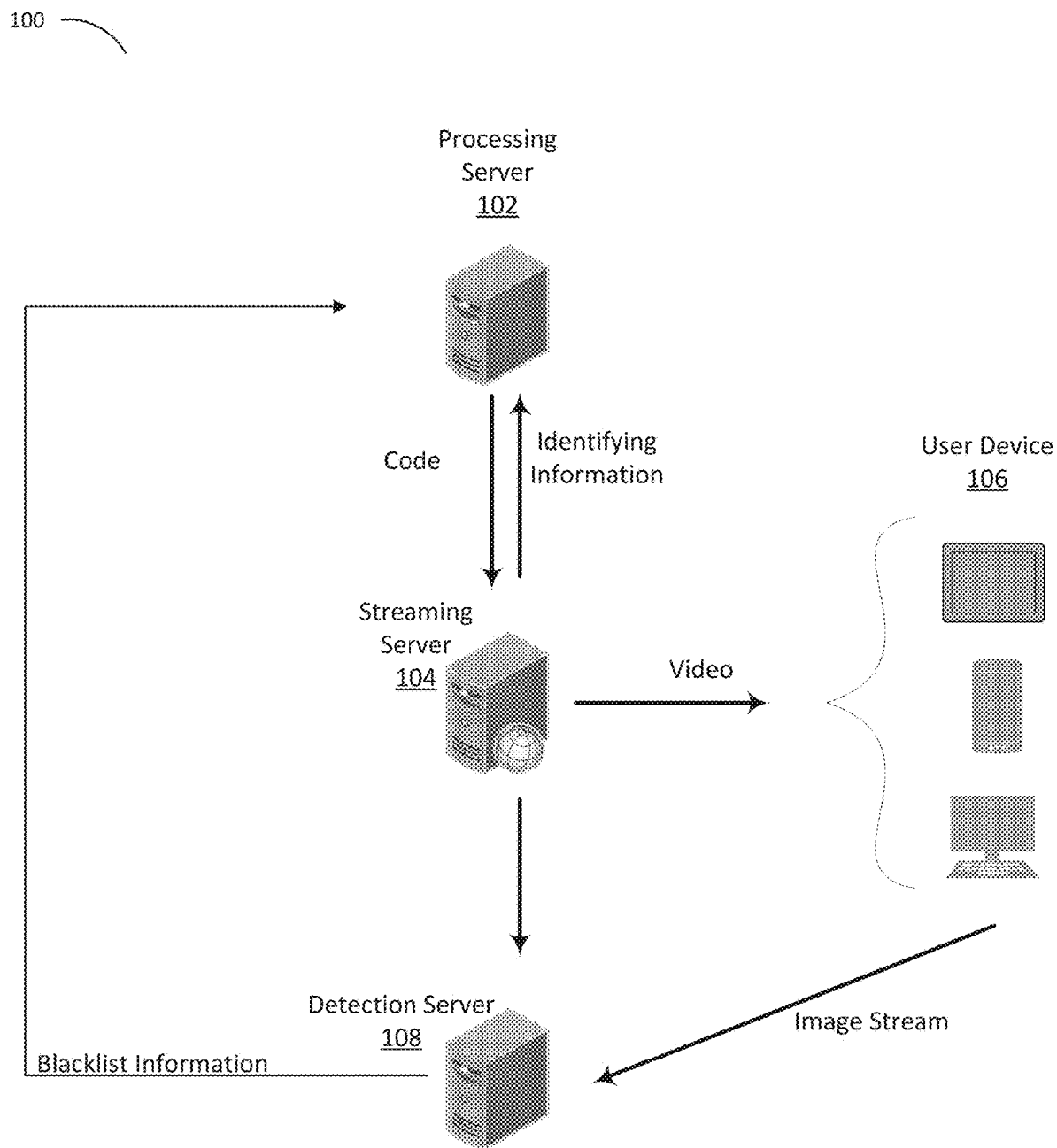
FIG. 1 is a block diagram of a system configured to watermark video in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Secure and robust watermarking, i.e. watermarks that are not easily removed or altered into an undetectable form, helps to avoid video piracy for the benefit of content providers and distributors. Server-side watermarking requires integration with complex and time sensitive media workflows. In OTT video streaming environments, clients are frequently open devices such as mobile phones, laptops or Personal Computers. Integrating watermarking into these devices may be more complicated than with traditional set-top-boxes because the content owner and distributor has little control over the client device and because of the broad range of client devices. Server-controlled, client-inserted watermarks, therefore, would be a vast improvement on current systems making the verification process easier to deploy, more secure and more robust. Server-controlled and client-inserted watermarks are further, easier and faster to detect with more powerful response capabilities. By leveraging the existing GPU of the client device to embed watermarks, embodiments of the present invention enable low integration cost and effort, seamless targeted deployment, near real-time identification of pirated video streams, and rapid identification and takedown of illegally rebroadcasted content.

Certain embodiments have the benefit of being robust to standard attacks and require higher levels of technical competence to accomplish than otherwise required in the state of the art, for example in basic screen captures. Similarly, GPU code may be difficult to debug due to the lack of available debugging tools, specialized knowledge in parallel programming and GPU programming specifically. Additionally, GPU code may be pre-compiled to further frustrate reverse engineering. Further, the shader code can be protected through various techniques such as code and data transformations, control flow and call graph transformations, obfuscation, whitebox cryptography techniques, node- or device-locking, encryption, and/or code signing. GPU support of signed and/or encrypted code and GPU support for secure execution can be provided.

Embodiments of the invention may utilize graphics languages that interact with the GPU such as Open Graphics Library (OpenGL). The graphics language may be utilized to insert a watermark during playback. For example, shader code may be modified and distributed via a server and run on the user device embedding a watermark during playback of the video. In some embodiments an open channel between the streaming server and the player may be maintained so that a synchronized challenge and response is performed to ensure that the execution is on the GPU and is not emulated. In some embodiments, the GPU code may be targeted to individual sessions or subscribers. In other embodiments the GPU code may be tailored to the video content type. For example, the code may be modified specifically for sporting events, action movies or animations. Additionally, a risk profile of the video session, the video content or the subscription may cause a specific kind of code to be executed. High piracy events such as boxing matches, or new release videos, as well as suspected subscribers, may get more scrutiny and default to less trust in some embodiments. Additional content examples may include personal video recordings, video games, virtual reality, augmented reality and similar systems.

Some embodiments may include a processing server where the graphics language code is modified, fixed up, and/or sent to the streaming server. The streaming server, in some embodiments may provide the modified graphics language code to the user device or video player. The video player or user device may play back the video using the local GPU. During playback of the video, the video or frames of the video may be coded with a watermark such including the user's Internet Protocol (IP) address, a user ID or other identifying information, such as a TMID. Pirated content, i.e. content distributed in an unauthorized manner, may be provided from the user device or through the internet, to a detection server. The detection server may detect and identify which user or device modified the video through the watermark. The detection server may provide real-time detection and/or rapid response capabilities for video providers in order to prevent future piracy.

FIG. 1 is a block diagram of a system 100 configured to embed watermark information in video content, and detect the watermark downstream, in accordance with some implementations. System 100 may include processing server 102, streaming server 104, user device 106 and detection server 108. In some embodiments streaming server 104 may include corruption and the processing server may generate GPU code with fixup and marking. This may be accomplished using graphics library (GL) corruption programming code, GL fixup and mark programming code, and canvas copy code. The GL code can be in conformance with OpenGL. Streaming server 104 may include any video content and distribution server accessed via a web application or local applet/application. Streaming server 104 may be maintained by content distributor, for example, a commercial service such as Netflix™ or Amazon Video™. Streaming server 104 may include one or more servers in a distributed network.

It will be appreciated by one in the art that the illustrated system 100 is merely exemplary and a simplification of a number of ways of distributing a watermarked content or video and detecting piracy. For example, processing server 102 may be more than one server in a network. Processing server 102 may include a network of processing servers distributed over one or more geographies. Similarly, processing server 102 may be coupled with streaming server 104 on the same machine to provide faster and more reliable service. Additionally, detection server 108 may be separate from processing server 102 as illustrated or as part of the same machine or system. Similarly, detection server 108 may include one or more networked detection servers to enable more piracy detection over a distributed geography occurring in real-time. The term "server" as used herein can refer to one more devices acting as a server.

User device 106 may be a personal computer (PC), a smart phone, a tablet, or a laptop, for example, on which an end user wants to view a video. In some embodiments, streaming server 104 may provide the copyrighted video as well GPU or GL code to user device 106. In some embodiments, streaming server 104 may communicate with processing server 102 when queried for a video, as well as during playback. Streaming server 104 may send any identifying information, such as user information, to processing server 102. For example, streaming server 104 may send the user identity, IP address, subscriber information, history, user profile, device type, geography and/or risk profile to processing server 102. In a similar sense, the processing server 102 may provide GPU code, shader code, DRM fixup, descrambler information, blacklist identification information, and fixup information, as are well-known, to streaming server 104. The user Information may or may not be transmitted to the processing server. In one implementation the processing server will generate a TMID (watermarking session ID) and the session server or SMS can store the association between the TMID and the user information. In such an implementation, the processing only receives information necessary to make watermarking/code decisions to address privacy concerns.

Figure 2:
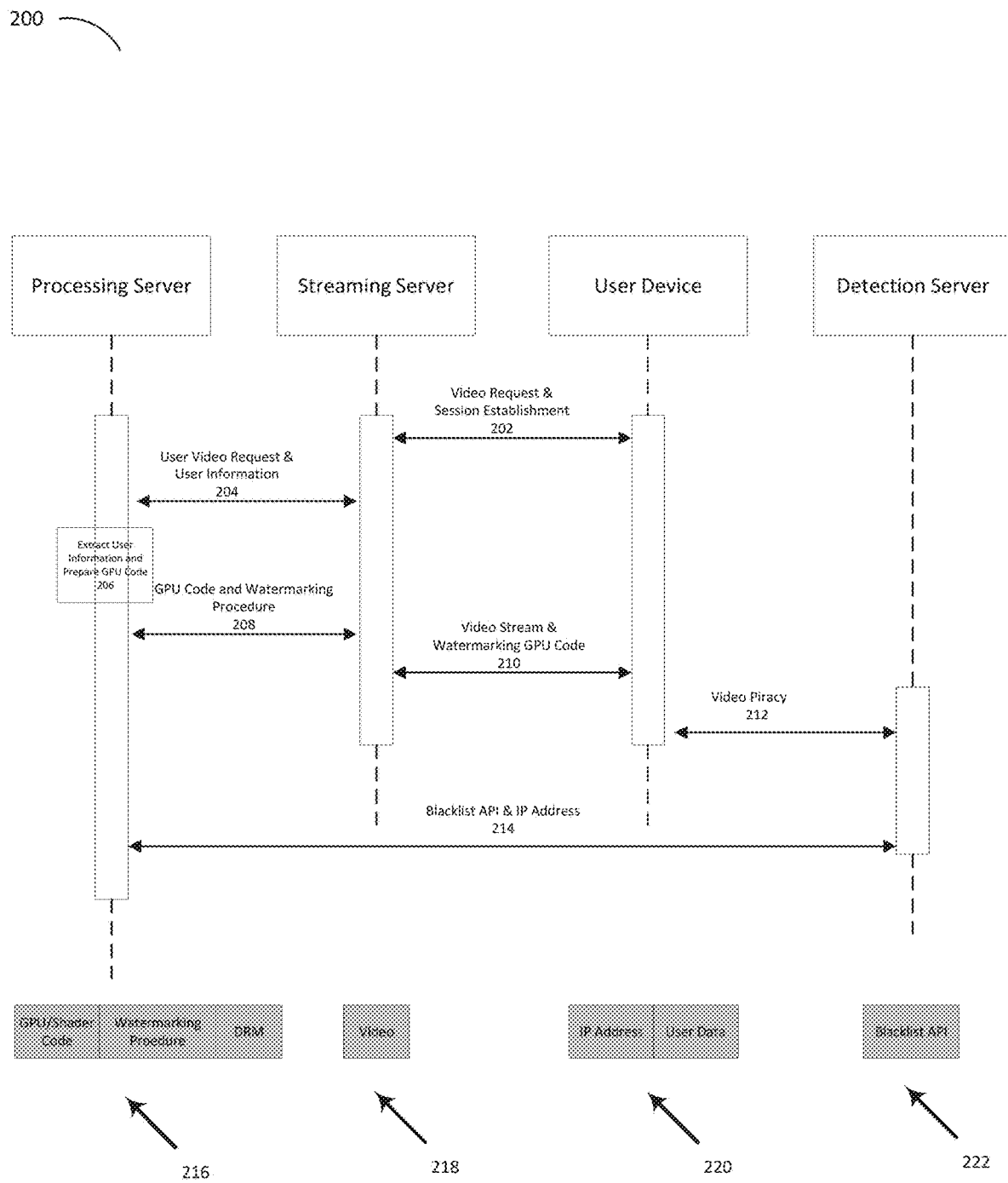
FIG. 2 is a flowchart representation of a method of watermarking and detecting pirated video in accordance with some implementations.

FIG. 2 is a flowchart representation of a method 200 of watermarking and detecting pirated video in accordance with some implementations. Method 200 may begin in step 202 where the user device sends a video playback request to the streaming server which maintains video 218. When the streaming server receives the video playback request it may decide whether or not to begin a playback session with the user device. For example, the streaming server may identify the user's playback rights for that video. Similarly, the streaming server may identify the region, content type or risk profile for that user. As illustrated, user data 220 may include the user's IP address and user data stored on a user device such as user device 106.

In step 204, the streaming server may transmit a user video request along with the identifying information to a processing server such as processing server 102. The request from the streaming server may include the session information for the user, the playback information, as well as user identification information. In step 206 the processing server may extract the identifying information from the video request and prepare GPU code, such as shader instructions, that includes a watermarking, i.e. a watermark embedding, procedure. In step 206, the processing server may prepare a watermarking procedure in line with the steps of method 300 discussed below with respect to FIG. 3. The processing server may maintain data 216 which may include DRM information, the GPU or shader code and the prepared watermarking procedure.

In step 208, the processing server may provide the GPU code and watermarking procedure to the streaming server. Step 208 may include an open channel communication back and forth between the streaming server and processing server as the video gets played back. DRM and fixup data may be transmitted to the streaming server during playback as well. In step 210 the streaming server may provide the copyrighted video to the user device along with the GPU code including the watermarking procedure. The user device may then play the with the watermarking procedure to take place on the GPU during playback. The video may be played back with the IP address of the user recorded in images or frames of the video. Other identifying information may also be recorded such as user identity, device information or account information. Of course, the content can be video content or another type of digital content such as a game.

In step 212, watermark detection occurs with video playback being performed on a detection server such as detection server 108. The term "playback", as used herein, refers to any type of inspection of the video content, including, but not limited to, a rendering operation. The detection server may play back the video including the watermark which was encoded on the user's device. The detection server may detect a pirated video and notify the processing server using blacklist API 222, which may be a representational state transfer (REST) application programming interface (API). Various known detection algorithms can be used for watermark detection.

Figure 3:
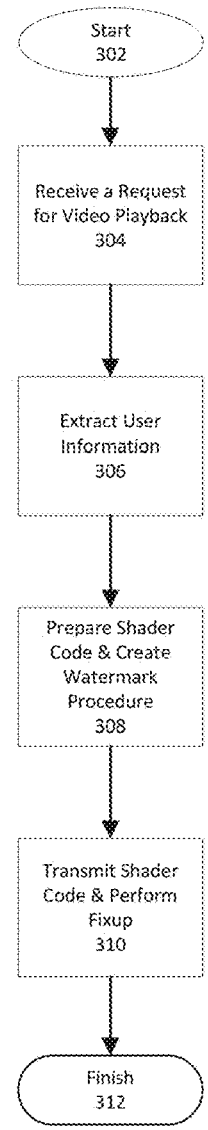
FIG. 3 is a flowchart representation of a method of watermarking video in accordance with some implementations.

FIG. 3 is a flowchart representation of a method 300 of watermarking video in accordance with some implementations. Processing server 102 may begin at step 302 and proceed to step 304. In step 304 processing server 102 may receive a request for video playback from streaming server 104. The request from streaming server 104 may be initiated by a request from user device 106.

Processing server 102 may proceed to step 306 where it may extract identifying information, such as user information, from the request received from the streaming server 104. The identifying information may include the user identity, IP address, subscriber information, history, user profile, device type, geography and/or risk profile, for example.

Processing server 102 may proceed to step 308 where it may prepare GPU code such as shader code including one or more watermarking procedures to be executed on the user device 106. Preparing shader or GL code as well as a watermarking procedure may be done in a number of different ways.

The GPU code may be GL code prepared by the processing server 102, for example using WebGL, OpenGL ES, etc. The GPU code may be prepared in order to perform forensic marking on one or more images of the streaming video during the last phase of the graphics pipeline prior to being rendered. Marks may be added once or multiple times in a single image or frame. Some watermarks may provide redundancy as well as forward error correction codes within multiple images/frames. Watermark procedures may be encoded both spatially and/or temporally such that the mark is context or position dependent. Various known watermarking procedures and processes can be implemented in accordance with embodiments. For example, the watermarking can be accomplished in various domains, such as by using a Discrete Cosine Transform, a Discrete Wavelet Transform, or a Discrete Fourier Transform.

In some embodiments, the watermarking procedure and/or algorithm may be entangled with one or more content fixup operations. For example, the algorithm may be entangled with DRM decryption, video de-corruption, video descrambling, etc. In this manner the marking procedure may not be able to be skipped without removing it from the graphics processing procedure without damaging the video content. In one embodiment computations may be performed in the GPU code during the watermarking procedure, that are necessary for continued playback or execution. For example, obfuscated URL calculation and/or session token calculations may be entangled with the watermarking procedure. In this example, a disruption to the watermarking procedure or code execution would stop playback, video game execution, or application function. Techniques described in U.S. Pat. Nos. 7,809,135, 7,797,549, 7,730,322, 7,506,177, 7,464,269, 7,397,916, 7,395,433, 7,350,085, 7,325,141, 6,842,862, 6,779,114, and/or 6,594,761 can be used to entangle the watermark procedure with rendering or other code in various known ways. For example, the shader code can be protected through various techniques such as code and data transformations, control flow and call graph transformations, obfuscation, whitebox cryptography techniques, node- or device-locking, encryption, and/or code signing. GPU support of signed and/or encrypted code and GPU support for secure execution can be provided.

In some embodiments the entanglement of data from a calling application and computations within the GPU code that perform the entangled calculations may be static or dynamically generated. To be statically generated, the entanglement may be such that it is fed parameters and generates different forensic marks in different situations. In dynamic situations the entanglements may be generated on the user device or on the processing server 102. Generation on the processing server 102 may include any known technique of data and control flow protection, randomization, diversity and other software protection techniques known in the art.

Streaming server 104 may include a calling application which communicates with processing server 102 to receive the GPU code, to exchange the identity of the user to be watermarked and to exchange the entanglement data. The entanglement data may be provided to the calling application on streaming server 104 in several ways. In one embodiment the entanglement data may be exchanged by modifying specific pixels or image geometry with the results of such calculations, as well as through the mark itself. In another embodiment, GL capabilities (such as OpenGL 2.0) may be used to pass data from the GPU to the CPU. In yet another embodiment more advanced techniques such as hiding results in the relationship between multiple output pixels spatially or temporally may be used. These computations may be based on data passed to the GPU from the processing server 102 or application on streaming server 104, or based on data within the image itself. Secure transfer of GPU codes may be used in further embodiments. Further, code obfuscation, GPU support of signed and/or encrypted code, and GPU support for secure execution can also be used to make reverse engineering more complicated.

An open channel between streaming server 104 and the user device 106 may be maintained. The open channel may provide bidirectional connectivity. The bidirectional connectivity may be used for a synchronized challenge and response communication to the executing GPU shader, which ensures the GPU is being executed and not emulated. The modified GPU or shader code, may be diverse for various users and devices. The GPU/shader code may be targeted to individual sessions or subscribers. The watermarking procedures or shader code may be tailored toward video content type. For example, a sporting event, an action video or an animation may require different watermarking procedures. In some embodiments, the risk profile of the users/session, content or subscription may be taken into account during coding the watermarking procedure. For example, high piracy events like boxing matches, or new release movies as well as previously suspected subscribers, may get more scrutiny and less trust by default.

In additional embodiments, specific enforcement windows may be targeted. Similarly, specific regions or features may be targeted for more robust watermarking procedures. In some embodiments the watermark may be resistant to cropping, scaling or rotation. In other embodiments the watermark may be further resistant to color changes, "keystoning", collusion and camcording.

In some embodiments, the shader code may be changed for each session and tailored uniquely to the risk profile of the session based on the content, the history of the subscriber, the device type, the geography, distribution window, and the evolving trust in the session over time. In other embodiments, the shader code may target specific regions of the broadcast, depending on the content type, enabling tradeoffs in visibility, robustness, and diversity, specifically allowing for dynamically adapting to piracy.

Processing server 102 may then proceed to step 310 where it may transmit the shader code to the streaming server 104. Similarly, in step 310 processing server 102 may transmit fixup, such as DRM information to streaming server 104. In some embodiments the GPU or shader code may be entangled with the code being sent from the streaming serve 104 to user device 106. The entangled code may be sent from the streaming server 104 including a challenge and response which is performed between streaming server 104 and user device 106. In this way, the streaming server may ensure delivery of the GPU code to the user device 106. The streaming server 104 may deliver challenges from a feed forward path for processing in the shader code. The streaming server 104 may then collect the challenge responses from the user device 106 and return them through the feedback path.

Once the challenge and response mechanism is executed, the streaming server 104 may communicate with the processing server 102 to receive further fixup based on whether the user device has accurately passed the challenge/response. For example, when the GPU is being emulated and the feedback challenge fails, the processing server 102 may be alerted by the streaming server 104. The processing server 102 may then provide fixup which disables playback of the video. Processing server 104 may then proceed to step 312 where it may stop.

Figure 4:
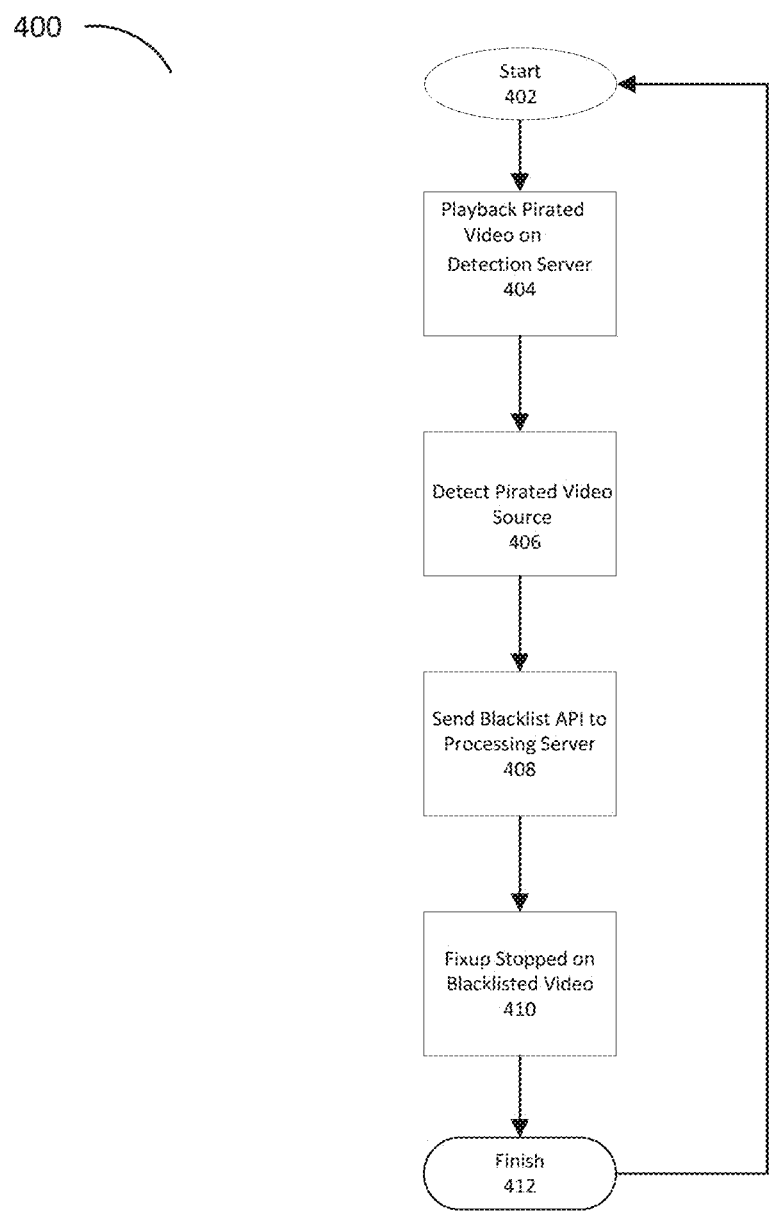
FIG. 4 is a flowchart representation of a method of identifying watermarked video in accordance with some implementations.

FIG. 4 is a flowchart representation of a method 400 of identifying watermarked video in accordance with some implementations. Detection server 108 may begin in step 402 and proceed to step 404. In step 404 one or more servers such as detection server 108 may playback the video collected from one or more user devices 106. The video analysed on the detection server has been watermarked, in the manner described above, during playback on the user device. Detection server 108 may then proceed to step 406.

In step 406 detection server 108 may identify a pirated video, i.e. a video that has been distributed in an unauthorized manner. Identifying a pirated video may include collecting forensic information from the watermarked content over multiple images or frames of the played back video, application or video game. Some embodiments may include detecting redundancy and/or forward error correction. Other embodiments may include using statistical models for collusion detection and identification. Marks may be detected via encodings done, which are both spatially and temporally adaptive. In some embodiments a displayed IP address may indicate a pirated video. In other embodiments, no IP address may indicate a non-pirated video.

In step 408 detection server 108 may transmit a blacklist notification to processing server 102 when piracy has been detected. After detection of a watermark/IP address or pirated video, the detection server 108 may notify the processing server 102 of the IP address of the pirated video or identifying information for where the piracy has occurred. The detection server 108 may proceed to step 410. In step 410 the detection server 108 may stop further playback of the pirated video on the identified device by stopping DRM fixups, license data, or the like from being sent to streaming server 104. Further, processing server 102 may notify the streaming server 104 of the identified user and stop playback or blacklist the user through streaming server 104. The Detection server 108 may proceed to step 412 and stop execution or return to step 402 and proceed again identifying another pirated video and user. Blacklisting can be accomplished in any manner that indicates that content and/or the distribution channel is marked as unauthorized. For example, code can be changed, streaming delivery can be stopped, or communication channels or protocols can be changed to stop code processing. The blacklisting decision can be communicated directly to any of the computing devices and need not go through the processing server.

Figure 5:
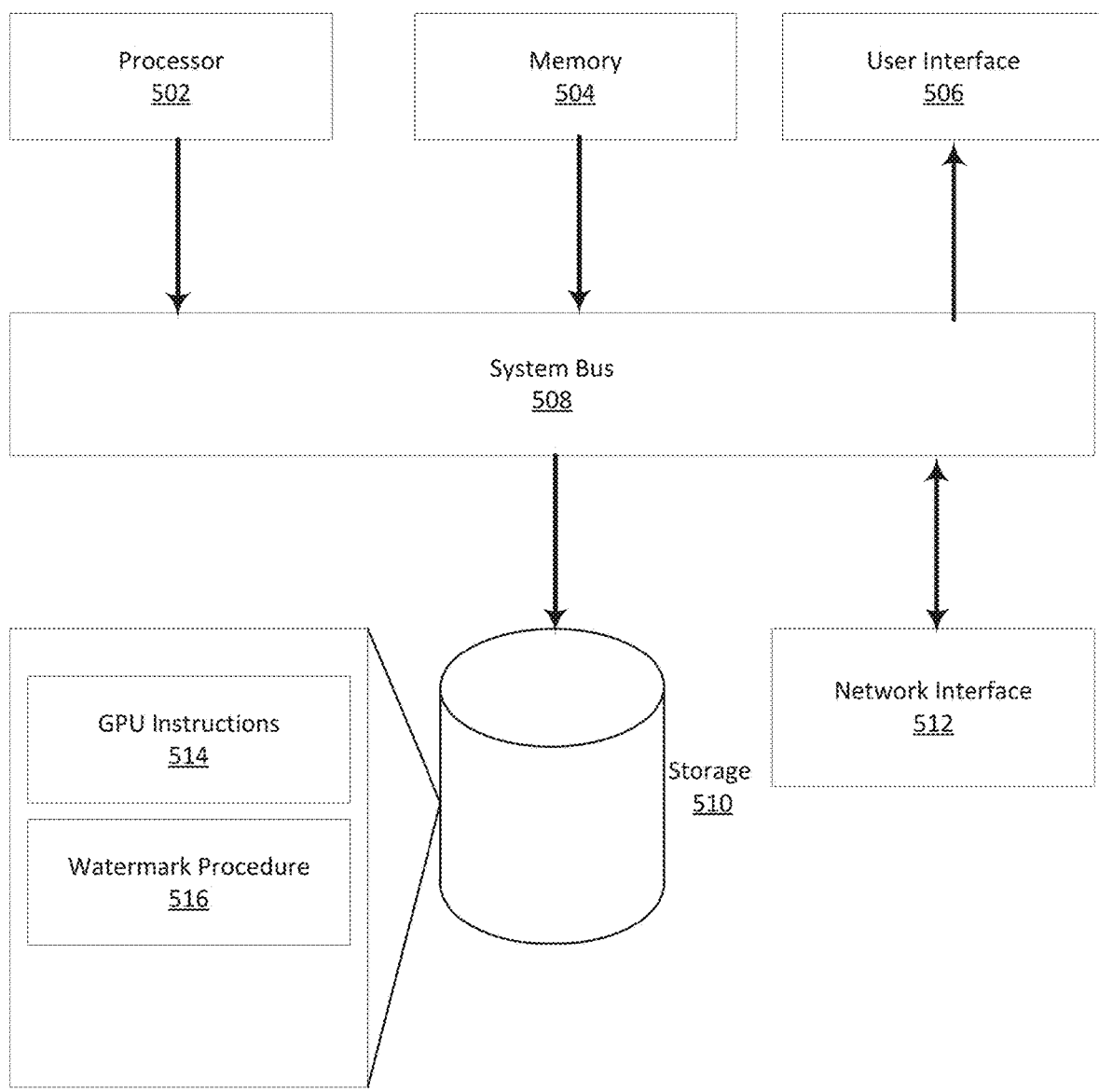
FIG. 5 is a block diagram of a server system in accordance with some implementations.

FIG. 5 is a block diagram of a server system 500 in accordance with some implementations. The server system 500 may correspond to one or more processing servers 102, streaming servers 104, and/or detection servers 108. As shown, server system 200 includes processor 502, memory 504, user interface 506, storage 510 and network interface 512 interconnected via one or more system buses 508.

The processor 502 may be any hardware device capable of executing instructions stored in memory 504 or storage 510 or otherwise processing data. As such, the processor may include a microprocessor, one or more field programmable gate array(s) (FPGA), application-specific integrated circuit (ASIC), GPUs or other similar devices.

The memory 504 may include any of various memory types such as L1, L2, L3 cache or system memory. As such, memory 504 may include static random access memory (SRAM), dynamic RAM (DRAM), flash memory, solid state device (SSD), read only memory (ROM), or other similar devices.

The user interface 506 may include one or more devices for enabling communication with a user such as an administrator. For example, the user interface 506 may include a display, a mouse, and a keyboard for receiving user commands. In some embodiments, the user interface 506 may include a command line interface or graphical user interface that may be presented to another or remote terminal via the network interface 512.

The network interface 512 may include one or more devices for enabling communication with other hardware devices. For example, the network interface 250 may include a network interface card (NIC) configured to communicate according to Ethernet protocol. Additionally, the network interface 512 may implement a TCP/IP stack for communication according to the TCP/IP protocols. A 4G/5G/LTE, WIFI, or any other wireless protocol may similarly be used. Various alternative or additional hardware or configurations for the network interface 512 will be apparent to one of skill in the art.

The storage 510 may include one or more machine readable storage media such as read only memory (ROM), random access memory (RAM), SSD, magnetic disk storage media, optical storage media, flash memory devices, etc. In various embodiments, the storage 510 may store instructions for execution by the processor 502 or data upon which the processor 502 may operate. For example, the storage 510 may store GPU instructions 514 which may be created and packaged to be sent to another device or server. In other embodiments the GPU instructions 514 may be executed locally. Similarly, storage 510 may include watermark procedure 516 which is modified, created, and packaged to be sent to another device or server.

It will be apparent to one in the art that various information described as stored in the storage 510 may be additionally or alternatively stored in the memory 504. All memory and storage may include non-transitory machine-readable instructions. Both storage 510 and memory 504 may both be considered non-transitory machine-readable media. All functions of the embodiments can be accomplished by software executed on computer processors. The processor(s) may be configured to provide information processing capabilities in various computing devices. The processor(s) may include one or more of a digital processor, an analog processor, a digital circuit designed to process information, an analog circuit designed to process information, a state machine, and/or other mechanisms for electronically processing information. In some implementations, processor(s) 128 may include a plurality of processing units. These processing units may be physically located within the same device, or processor(s) may represent processing functionality of a plurality of devices operating in coordination. Processor(s) may be configured to execute modules by software; hardware; firmware; some combination of software, hardware, and/or firmware; and/or other mechanisms for configuring processing capabilities on processor(s). As used herein, the term "module" may refer to any component or set of components that perform the functionality attributed to the module. This may include one or more physical processors during execution of processor readable instructions, the processor readable instructions, circuitry, hardware, storage media, or any other components.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed:

1. A method performed by a processing server, the method comprising:
   receiving, on the processing server, a request from a streaming video server for a video to be rendered on a user device during a session, the user device including a graphics processing unit (GPU);
   preparing, by the processing server, shader software code to be executed on the GPU on the user device, wherein the preparing includes creating a watermarking procedure to get executed during a rendering process on the user device to thereby create a digital watermark upon execution by the GPU of the shader software code;
   processing the shader code with software protection techniques, wherein the protection techniques are code and data transformations, control flow and call graph transformations, obfuscation, whitebox cryptography techniques, node- or device-locking, encryption, and/or code signing; and
   transmitting, by the processing server, the shader software code to the streaming video server to be transmitted to the user device for execution by the GPU of the user device during the rendering process to create a watermarked video.

2. The method of claim 1, further comprising extracting, by the processing server, a set of identifying information from the request for the video and wherein the watermark procedure is created based at least in part on the identifying information.

3. The method of claim 2, further comprising:
   extracting, by the processing server, a content type of the video from the set of identifying information; and
   updating, by the processing server, the watermarking procedure based on the content type of the video, wherein the content type is a sporting event, action video or animation video.

4. The method of claim 3, further comprising:
   extracting, by the processing server, a profile of the user from the set of identifying information;
   determining, by the processing server, a risk profile for the session based on the profile of the user; and
   updating, by the processing server, the watermark procedure based on the risk profile of the session, content or subscription.

5. The method of claim 4, further comprising:
   determining, by the processing server, the risk profile based on the content of the video, the history of the user, the device type, the geography of the user, and/or a distribution window.

6. The method of claim 2, further comprising:
   extracting, by the processing server, a content type of the video from the set of identifying information; and
   updating, by the processing server, the watermark procedure to target a specific enforcement window, and geographic region based on the content type.

7. The method of claim 6, further comprising:
   updating, by the processing server, the watermark procedure to:
     perform a calculation that is used as a challenge and response from a detection server;
     deliver the shader software code to the GPU for execution;
     deliver challenges from a feed forward path for processing in the shader software code; and
     collect the challenge responses and return the challenge responses through a feedback path and/or use the challenge responses for further processing.

8. The method of claim 1, further comprising:
   updating, by the processing server, the watermark procedure to be part of a digital rights management decryption, de-corruption, or descrambling process, so that the watermark code cannot be skipped and includes computations in the GPU that are required for continuous video playback.

9. The method of claim 1, further comprising:
   updating, by the processing server, the watermark procedure to modify pixels and/or image geometry.

10. The method of claim 9, further comprising:
    modifying multiple output pixels spatially and/or temporally.

11. The method of claim 1, further comprising:
    updating, by the processing server, the watermark procedure to:
      encode the watermark multiple times in an image of the video;
      collect forensic information over multiple images in the video; and
      include forward error correction codes for identification in the video.

12. The method of claim 1, further comprising:
    playing back the watermarked video by a detection server;
    identifying, by the detection server, the video's watermark;
    determining, by the detection server, whether the video was illegally copied by inspecting the identified watermark; and
    transmitting, by the detection server, an indication to blacklist the user device, when the video is determined by illegally copied.

13. A method performed by a detection server, the method comprising:
    playing back, by the detection server, a watermarked video that was rendered on a user device having a graphics processor unit (GPU);
    identifying, by the detection server, the video's watermark, wherein the watermark was created during execution of a watermarking procedure executed by the GPU of the shader software code during playback on the user device and wherein the watermark procedure was prepared by a processing server as part of the shader software code that was executed on the GPU of the user device, wherein the shader code was processed with software protection techniques, wherein the protection techniques are code and data transformations, control flow and call graph transformations, obfuscation, whitebox cryptography techniques, node- or device-locking, encryption, and/or code signing; and
    transmitting, by the detection server, to the processing server an indication to blacklist the user device when the video is determined to be illegally copied by inspection of the video's watermark.

14. The method of claim 13, wherein the watermark procedure was created based at least in part on identifying information obtained from a request to play the video content on a user device.

15. The method of claim 14, wherein the watermarking procedure was created by:
    extracting, by the processing server, a content type of the video from the identifying information; and
    updating, by the processing server, the watermarking procedure based on the content type of video.

16. The method of claim 14, wherein the watermarking procedure was further created by:
- extracting, by the processing server, a profile of the user from the set of identifying information;
- determining, by the processing server, a risk profile for the session based on the profile of the user; and
- updating, by the processing server, the watermark procedure based on the risk profile of the session, content or subscription.

17. A device comprising:
- a network interface;
- a processor configured to execute computer readable instructions included on a non-transitory memory; and
- a non-transitory memory including computer readable instructions, that when executed by the processor, cause the device to:
- receive, as a processing server, a request from a streaming video server for a video to be played on a user device during a session, wherein the user device includes a graphics processing unit (GPU);
- prepare, by the processing server, shader software code to be executed on a GPU of the user device, wherein the preparing includes creating shader code for executing a watermarking procedure by the GPU to thereby create a watermark that during a rendering process on the user device that is to be that is to be embedded in the video;
- process the shader code with software protection techniques, wherein the protection techniques are code and data transformations, control flow and call graph transformations, obfuscation, whitebox cryptography techniques, node- or device-locking, encryption, and/or code signing; and
- transmit, by the processing server, the shader software code to the streaming video server to be transmitted to the user device for execution by the GPU of the user device during video playback.

18. The device of claim 17, wherein a set of identifying information is extracted from the request for the video and wherein the watermark procedure is created based at least in part on the identifying information.

19. The device of claim 18, wherein the computer readable instructions, when executed, further cause the device to:
- extract, by the processing server, a content type of the video from the set of identifying information; and
- update, by the processing server, the watermarking procedure based on the content type of the video, wherein the content type is a sporting event, action video or animation video.

20. The device of claim 19, wherein the computer readable instructions, when executed, further cause the device to:
- extract, by the processing server, a profile of the user from the set of identifying information;
- determine, by the processing server, a risk profile for the session based on the profile of the user; and
- update, by the processing server, the watermark procedure based on the risk profile of the session, content or subscription.

21. The device of claim 20, wherein the computer readable instructions, when executed, further cause the device to:
- determine, by the processing server, the risk profile based on the content of the video, the history of the user, the device type, the geography of the user, and/or a distribution window.

22. The device of claim 20, wherein the computer readable instructions, when executed, further cause the device to:
- extract, by the processing server, a content type of the video from the set of identifying information; and
- update, by the processing server, the watermark procedure to target a specific enforcement window, and geographic region based on the content type.

23. The device of claim 17, wherein the computer readable instructions, when executed, further cause the device to:
- update, by the processing server, the watermark procedure to:
  - perform a calculation that is used as a challenge and response from a detection server;
  - deliver the shader software code to the GPU for execution;
  - deliver challenges from a feed forward path for processing in the shader software code; and
  - collect the challenge responses and return the challenge responses through a feedback path and/or user the challenge responses for further processing.

24. The device of claim 17, wherein the computer readable instructions, when executed, further cause the device to:
- update, by the processing server, the watermark procedure to modify pixels and/or image geometry.

25. The device of claim 24, wherein the computer readable instructions, when executed, further cause the device to:
- modify multiple output pixels spatially and/or temporally.

26. The device of claim 17, wherein the computer readable instructions, when executed, further cause the device to:
- update, by the processing server, the watermark procedure to:
  - encode the watermark multiple times in an image of the video;
  - collect forensic information over multiple images in the video; and
  - include forward error correction codes for identification in the video.

* * * * *